Aug. 25, 1953          G. W. CRABTREE          2,649,936
                HYDRAULIC SPRING CONTROLLING UNIT
Filed May 15, 1950                            2 Sheets-Sheet 1
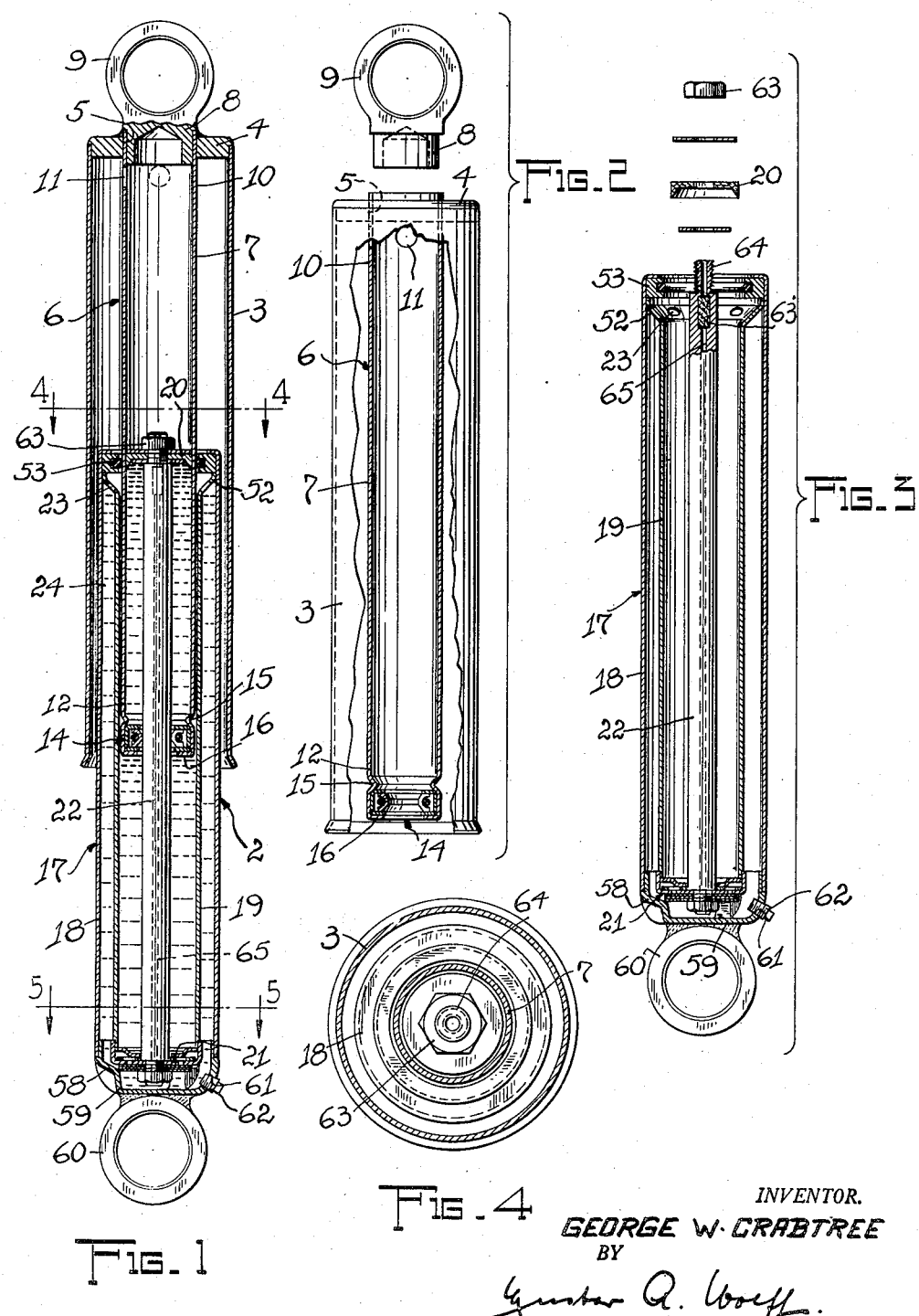
INVENTOR.
*GEORGE W. CRABTREE*
BY
*Gunter A. Wolff*
ATT.

Aug. 25, 1953  G. W. CRABTREE  2,649,936
HYDRAULIC SPRING CONTROLLING UNIT
Filed May 15, 1950  2 Sheets-Sheet 2

INVENTOR.
GEORGE W. CRABTREE
BY
Gustav A. Wolff
ATT

Patented Aug. 25, 1953

2,649,936

UNITED STATES PATENT OFFICE 2,649,936

HYDRAULIC SPRING CONTROLLING UNIT

George W. Crabtree, Cleveland Heights, Ohio

Application May 15, 1950, Serial No. 162,006

8 Claims. (Cl. 188—88)

The present invention relates to double-acting, hydraulic spring-controlling units of the directly-actuated type which check and retard movements of vehicle springs under compression and their reflex actions under rebound by forcible displacement of liquid from one end of a working chamber to its other end and vice versa. To avoid or reduce common leakage in this type of double-acting, hydraulic spring-controlling unit it has been proposed in my co-pending application, Serial No. 123,016, filed October 22, 1949, to construct a hydraulic spring-controlling unit embodying a liquid-filled cylindrical working chamber subdivided into two axially-aligned cylinder sections by a passaged valve member for restricted communication of the cylinder sections with each other, the working chamber slidably supporting a piston couple so that its pistons are arranged in different cylinder sections and alternately force through the passaged valve member liquid from one of the cylinder sections into the other one or vice versa, an arrangement which though highly practical, cannot be constructed without materially increasing the overall dimensions of present day hydraulic spring-controlling units.

The general object of this invention is the provision of an improved hydraulic spring-controlling unit of the type described above having substantially reduced overall dimensions over present day spring-controlling units, the unit including two axially aligned cooperating combined cylinder and piston members arranged for reciprocatory movements with respect to each other, the cooperating combined cylinder and piston members having their cylinders intersleeved, each of the pistons of said combined cylinder and piston members being arranged to reciprocate in the cylinder of the other one of said combined cylinder and piston members, and one of the pistons of said combined cylinder and piston members including passaged valve means to effect in a controlled action forcible displacement of liquid from one cylinder member into the other cylinder member and vice versa.

Another object of the invention is the provision of a hydraulic spring-controlling unit of the type described above in which one of combined cylinder and piston members includes valve means adapted to automatically effect replacing of leakage liquid so as to keep the cylinder members continuously filled and prevent air and vapor bubbles from being formed in such cylinder members.

A further object of the invention is the provision of a hydraulic spring-controlling unit of the type described above in which the passage valve means in the one of the pistons of said combined cylinder and piston members includes a valve having coordinated passages of variable cross section controlled by the pressure actuating upon the valve to effect a continuous, positive control of the checking or retarding action of the spring controlling unit.

Additional objects and novel features of construction, combination and relation of parts by which the objects in view have been attained, will appear and are set forth in detail in the course of the following specification.

The drawings accompanying and forming part of the specification illustrate a certain practical embodiment of the invention, but it will be apparent as the specification proceeds that the structure may be modified and changed in various ways without departure from the true spirit and broad scope of the invention.

In the drawings:

Fig. 1 is a sectional view, partly in elevation, showing a double-acting hydraulic spring-controlling unit constructed in accordance with the invention;

Fig. 2 is a side view partly in section and partly broken away of the upper one of the combined cylinder and piston members of the spring-controlling unit shown in Fig. 1;

Fig. 3 is a longitudinal sectional view through the partly disassembled lower one of the combined cylinder and piston members of the spring-controlling unit shown in Fig. 1;

Fig. 4 is a cross-sectional view on line 4—4 of Fig. 1;

Figure 5:
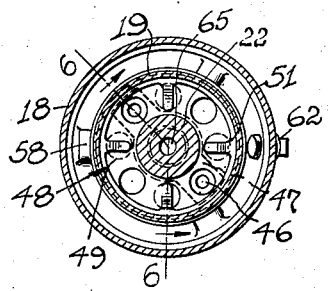
Fig. 5 is a cross-sectional view on line 5—5 of Fig. 1.
Figure 7:
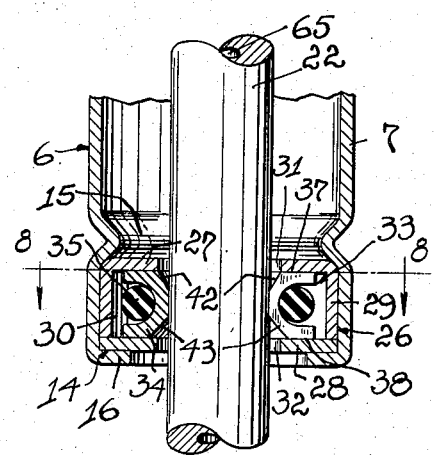
Fig. 7 is an enlarged fragmentary sectional view through the lower end of the upper one of the combined cylinder and piston members disclosing the piston including the valve structure.
Figure 6:
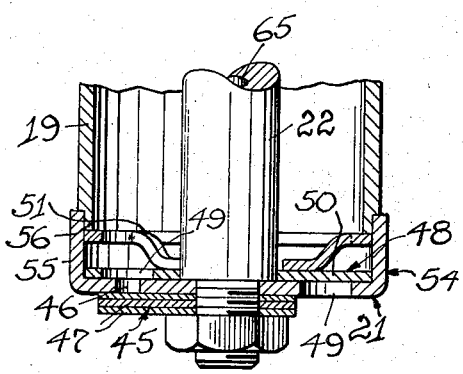
Fig. 6 is an enlarged, fragmentary, sectional view of the lower end of the lower one of the combined cylinder and piston members.

Referring now more in detail to the exemplified form of the invention shown in the drawings, reference numeral 2 denotes a double-acting hydraulic spring-controlling unit which includes a tubular shielding sleeve 3 closed at its upper end by a ring-shaped top plate 4. This top plate has extended through its central opening 5 a cylinder member 6 formed by a circular tube 7, the upper end of which has extended thereinto and secured thereto a head 8 provided with a ring 9. Tube 7 includes at its upper portion 10, just below head 8, breather openings 11 and mounts at its lower end portion 12 a piston and valve member 14 provided with a valve construction of the type shown and claimed in my copending application, Serial No. 154,408, filed April 6, 1950, for Spring Controlling Member, which piston and valve member is seated against a circular rib 15 in tube 7 and held in proper position by the inwardly extended circular flange 16 of said tube.

The thus constructed cylinder member 6 has sleeved thereon a combined cylinder and piston member 17 including an outer tube 18, an inner tube or cylinder member 19 smaller in diameter than tube 18 and secured to the upper end thereof, and a piston member 20 slidably arranged in cylinder member 6 and connected to the valved end wall 21 of cylinder member 19 by a piston rod 22 which is slidably extended through the piston and valve member 14. The outer tube 18 forms with cylinder member 19 a liquid storage chamber 24 of ring-shaped cross section which is in open communication with the upper end portion of cylinder member 19 by passages 23 and in valved communication with the lower portion of the cylinder member 19 by valve means later to be described. Cylinder member 19 slidably encircles the cylinder member 6 so that in spring-controlling operations reciprocatory movements of combined cylinder and piston member 17 with respect to cylinder member 6 forces by the piston member 20 liquid from cylinder member 6 through piston and valve member 14 into cylinder member 19, or forces by valved end wall 21 of cylinder member 19 liquid from said cylinder member through piston and valve member 14 into cylinder member 6.

Figure 8:
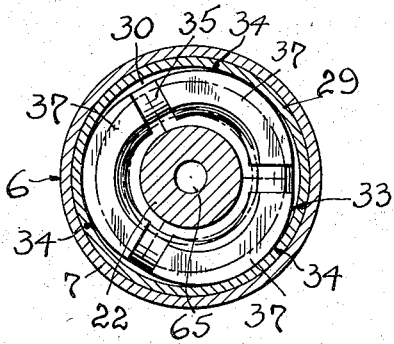
Fig. 8 is a cross-sectional view on line 8—8 of Fig. 7.
Figure 9:
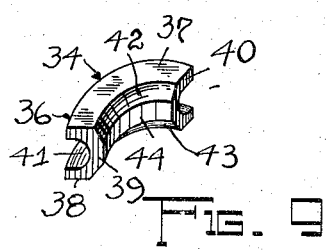
Fig. 9 is a perspective view of one of the valve elements of the valve member arranged in the piston of the lower one of the combined cylinder and piston members.

The piston and valve member 14 which controls communication between cylinder member 6 and cylinder member 19 embodies a ring-shaped housing 26 consisting of a ring-shaped flanged disk 27 and a ring-shaped disk 28 engaging the circumferential flange 29 of disk 27. This housing forms with piston rod 22 a ring-shaped working chamber 30 as piston rod 22 extends through circular openings 31 and 32 in disks 27 and 28, respectively. The working chamber 30 shiftably mounts a ring-shaped valve 33 composed of a plurality of sector-like valve elements 34 assembled to form the valve 33 (see dash-dotted lines in Fig. 8) when the individual valve elements 34 are yieldingly held in proper position with respect to each other by a rubber ring 35 encircling the valve 33. The thus constructed valve 33 permits its differential opening up against the tension of rubber ring 35 when, in operation of the spring-controlling unit, liquid is forced by piston member 20 or valved end wall 21 from cylinder member 6 through valve 33 into cylinder member 19 or vice versa. In such a case liquid under pressure forces the individual valve elements against the tension of rubber ring 35 outwardly and thus increases the cross section of the liquid passing area of valve 33. A decrease in the pressure of the working liquid reduces, of course, the cross-section of the liquid passing area of valve 33 as rubber ring 35 tends to shift the valve elements inwardly to reduce or close the cross section of the liquid passing area of the valve. The valve elements 34 are exposed to the pressure of liquid on their top and bottom faces in the reciprocatory movements of the two composite cylinder and piston members with respect to each other, therefore, spring-controlling unit 2 will control both compression and reflex stresses of vehicle springs. The valve elements 34 are identical in construction, each embodying a ring sector body 36 having flat top and bottom faces 37 and 38 and flat end faces 39 and 40 angularly related to each other in planes intersecting the axis of the ring body of valve 33 formed by the valve elements 34. Each valve element has arranged in its outer peripheral wall a channel 41 to permit proper seating of rubber ring 35 which holds the valve elements in proper relation with respect to each other. Each valve element, furthermore, includes inclined wall portions 42 and 43, wall portion 42 being extended from the top face 37 toward the inner wall 44 of the valve element and wall portion 43 extending from the bottom face 38 to such inner wall. The projected areas of the inclined wall portions projected upon a cylindrical surface coaxial with piston rod 22 determine the ratio of the force exerted to shift the valve elements against the tension of rubber ring 35 and effect an increase in the cross section of the liquid passing area of the valve and thus provides a simple, economic means to control the size of the liquid passing area of the valve for all practical purposes. Preferably the inclined wall portions 42 and 43 differentiate in the size of their projected areas to properly control the cross section of the liquid passing area for both compression and reflex stresses of a vehicle spring.

The cylinder member 6 slidably extends into cylinder member 19, therefore, the volume of liquid forced in shock absorbing procedures from cylinder member 6 through piston and valve structure 14 into cylinder member 19, is smaller than the volume of liquid forced from cylinder member 19 through piston and valve structure 14 into cylinder member 6. This condition in the spring-controlling unit limits movement of the cooperating cylinder and piston members toward each other unless means are provided to by-pass during such movement the excess liquid from cylinder and piston member 17. Such by-passing of the excess liquid is effected through a valve 45 in end wall 21 of cylinder member 19, the valve consisting of bores 46 in said end wall closed by a plurality of superposed leaf springs 47. The above described difference in volume of liquid held by cylinder member 6 and cylinder member 19 furthermore necessitates intake of liquid into cylinder member 19 when the cooperating cylinder and piston members move away from each other. Such intake of liquid is effected through a valve 48 consisting of holes 49 in end wall 21 and closed by a spring-pressed valve disk 50, a soft spring member 51 being used to readily effect opening of valve 48 when the cooperating cylinder and piston members move away from each other.

The combined cylinder and piston member 17 is provided adjacent to the outwardly flared end portion 52 of the upper end of cylinder member 19 with a sealing member 53, to prevent escape of fluid from ring-shaped liquid storage chamber 24 which communicates through valves 45 and 48 with cylinder member 19.

The valve 48 is arranged in a cup-shaped member 54 including a circumferential flange 55 sleeved upon the reduced end portion 56 of cylinder member 19. This cup-shaped member rests on inwardly extended seat portions 58 of a second cup-shaped member 59 extended into the lower end of outer tube 18 and welded thereto. The second cup-shaped member 59 has secured to its outer end an attachment ring 60 and includes a filling opening 61 closed by a plug member 62.

The piston rod 22 has attached to its upper end piston 20 by a nut member 63 engaged with the threaded end 64 of the piston rod, which latter includes an axial bore 65 seating a filter 63' to feed back leakage of liquid into the cup-shaped member 59.

When attached to the frame and axle of an automobile, relative movements between frame and axle effect reciprocatory movements of the cooperating combined cylinder and piston members with respect to each other. When these members move away from each other, piston 20 forces liquid from cylinder 6 through piston and valve member 14 into cylinder member 19. In this action the liquid under pressure passes through piston and valve structure 14 and automatically regulates the size of the liquid flow passage proportionate to the pressure exerted by such liquid on the inclined wall portions 42 of elements 34, held in proper working position by rubber ring 35. When these members move toward each other, cylinder and piston member 17 effects in a similar manner forcible displacement of liquid from cylinder member 19 into cylinder 6 as will readily be understood from inspection of Fig. 1. The choking action of the piston and valve member 14 in this case is different from the previously referred to choking action of this member as wall portions 43 of elements 34 differ in area and inclination from the wall portions 42 of elements 34, and as cylinder and piston member 17 travels in an opposite direction.

Having thus described my invention what I claim is:

1. In a hydraulic spring-controlling unit, axially-aligned, intersleeved, cooperating inner and outer cylinder members and two piston members, said cylinder members being partly intersleeved and the piston members being positioned in the intersleeved portions of the cylinder members and secured thereto, one of the piston members being directly secured to the free end portion of the inner cylinder member and the other one of said piston members being secured to the outer cylinder member by a piston rod extended through said one piston member, a cylindrical tube sleeved upon said outer cylinder member forming therewith a ring-shaped liquid storage chamber, valve means controlling communication of said outer cylinder member with said storage chamber, and valved passage means in the said one piston member adapted to control reciprocatory shifting of liquid from either one of said cylinder members into either other one of said cylinder members when said intersleeved cylinder and piston members are reciprocated.

2. A hydraulic spring-controlling unit as described in claim 1, wherein the valved passage means of the one of the piston members includes a valve member assembly consisting of a plurality of individual cooperating valve sections arranged radially with respect to each other and yieldingly held in position with respect to each other and the piston rod of the other one of the piston members, and wherein the valve sections have parallel top and bottom surfaces and have arranged in said surfaces inclined surface portions adapted to effect radial shifting of the yieldingly held valve sections by fluid exerting pressure on such valve sections to fully control the choking action of the valve structure at varying fluid pressures.

3. A hydraulic spring-controlling unit as described in claim 2, wherein the inclined surface portions in the top and bottom surfaces of the valve sections differentiate in the size of their projected areas upon a cylindrical surface coaxial with the piston rod of the said other one of the piston members to effect differential radial shifting of such valve sections by fluid exerting pressure on the inclined surface portions of the top and bottom surfaces of the valve assembly.

4. In a hydraulic spring-controlling unit a first cylinder closed at one end by a choking valve structure, a second cylinder closed at one end by a valved closure member sleeved with its other end upon said first cylinder in slidable fluid tight engagement therewith, said two cylinders jointly forming a working chamber differentially varying in size when shifted with respect to each other, a piston in said first cylinder coupled with the valved end of said second cylinder by a piston rod slidably extended through the choking valve structure of said first cylinder, and a third cylinder closed at one end and seating and encircling said second cylinder in circumferentially spaced relation with respect thereto to form a ring-shaped chamber therewith, said third cylinder having its one end secured to said second cylinder and communicating at its other end with said second cylinder through its valved closure member.

5. A hydraulic spring-controlling unit as described in claim 4, wherein the said valved closure member embodies intake openings controlled by spring-actuated valve means, and bypass openings controlled by other spring-actuated valve means.

6. A hydraulic spring-controlling unit as described in claim 4, wherein the second cylinder is flared at its open end toward the inner wall of said third cylinder, and wherein the flared portion of the second cylinder is provided with a plurality of openings for open communication of the ring-shaped chamber with the space between said second and third cylinders.

7. In a hydraulic spring-controlling unit a first tubular cylinder, a ring-shaped piston and choking valve structure secured to one end of said cylinder, a second tubular cylinder closed at one end by spring controlled intake and outlet valves and sleeved with its other end upon said first cylinder in slidable fluid-tight engagement therewith, a third tubular cylinder closed at one end, encircling said second tubular cylinder in circumferentially spaced relation with respect thereto and provided with laterally spaced seating shoulders seating said second cylinder, said second cylinder having its open end flared outwardly and secured to said third cylinder to form therewith a liquid storage chamber of ring-shaped cross section adapted to communicate with said second cylinder through said valve members, and a piston member in said first cylinder coupled with said second cylinder by a piston rod slidably extended through said ring-shaped piston and choking valve structure.

8. A hydraulic spring-controlling unit as described in claim 7, wherein said piston rod is extended through said spring-controlled intake and outlet valves and includes an axial bore adapted to effect communication of the upper portion of said cylinder through said axial bore with the ring-shaped liquid storage chamber.

GEORGE W. CRABTREE.

References Cited in the file of this patent

UNITED STATES PATENTS

| Number | Name | Date |
|---|---|---|
| 1,156,646 | Walker | Oct. 12, 1915 |
| 2,078,364 | Becker et al. | Apr. 27, 1937 |
| 2,348,160 | Thornhill | May 2, 1944 |
| 2,472,840 | Lewton | June 14, 1949 |

FOREIGN PATENTS

| Number | Country | Date |
|---|---|---|
| 319,816 | Great Britain | Sept. 30, 1929 |
| 493,657 | Great Britain | 1938 |